May 5, 1970     C. O. JONES, JR., ETAL     3,510,610
SWITCHING APPARATUS
Filed Dec. 12, 1968     3 Sheets-Sheet 3
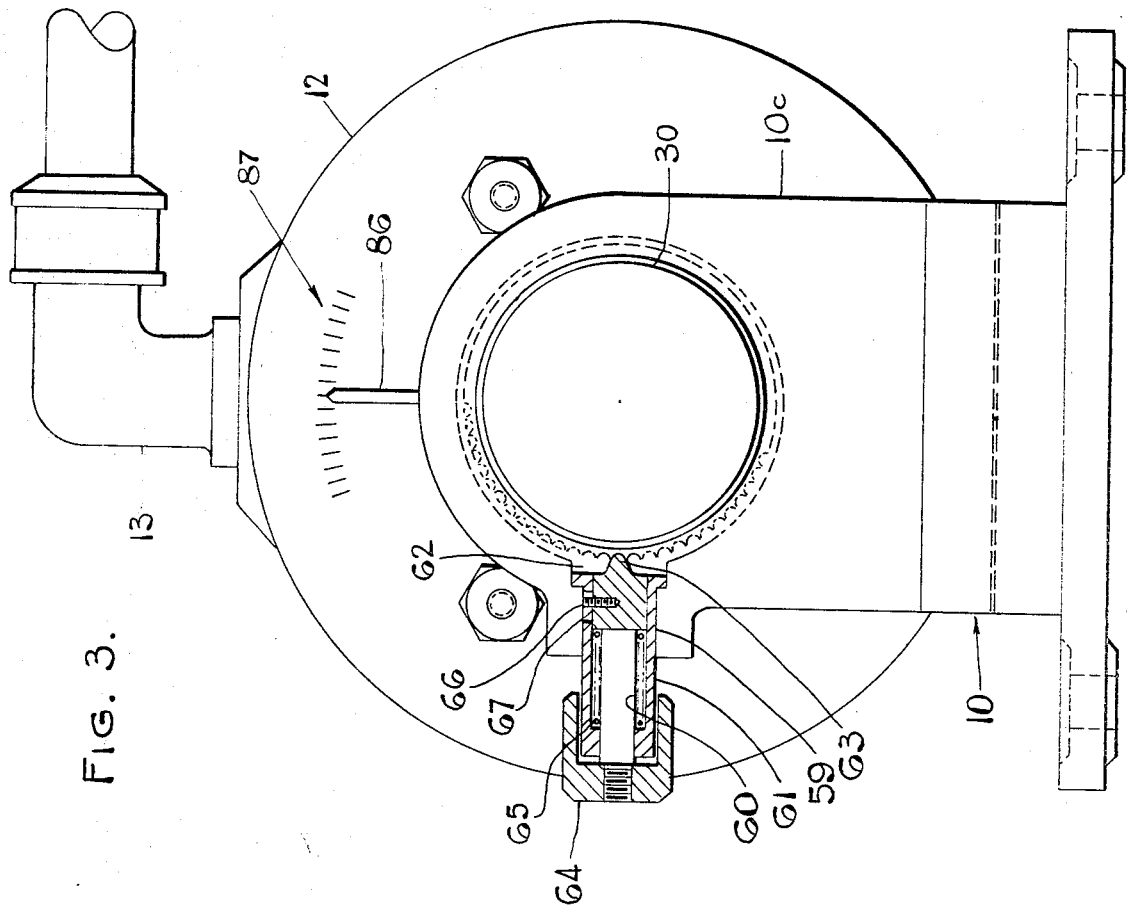
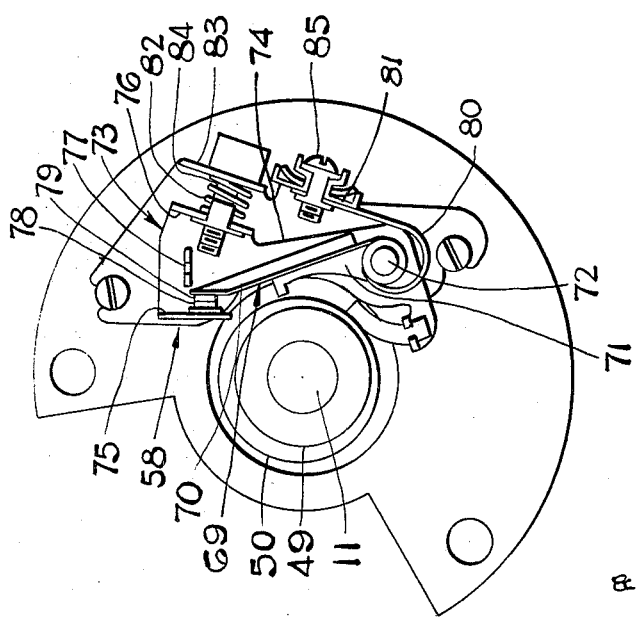
INVENTORS
CLARENCE O. JONES, JR.
& WILLIAM F. ABRAHAM
Christel & Bean
ATTORNEYS United States Patent Office 3,510,610
Patented May 5, 1970

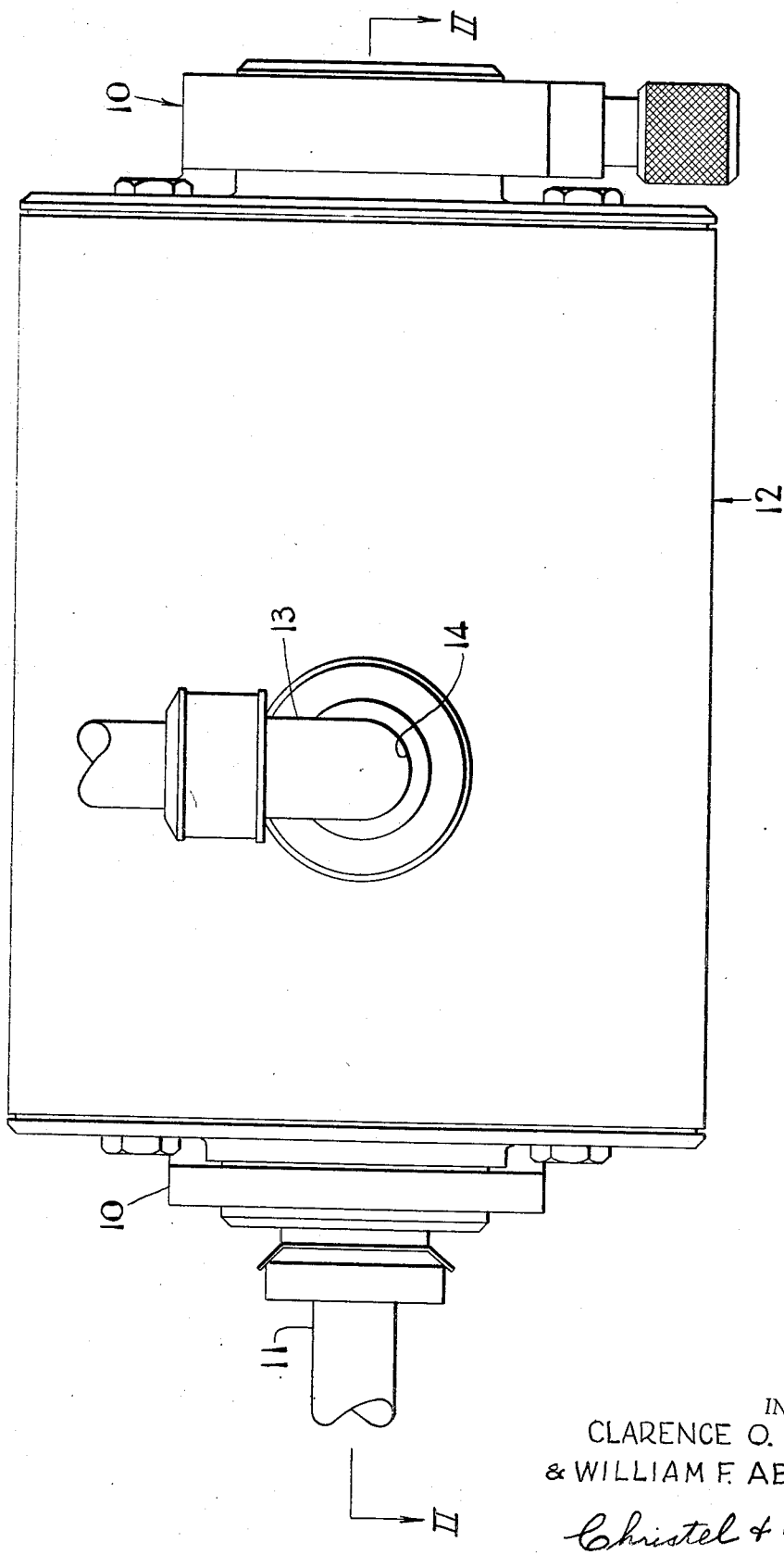

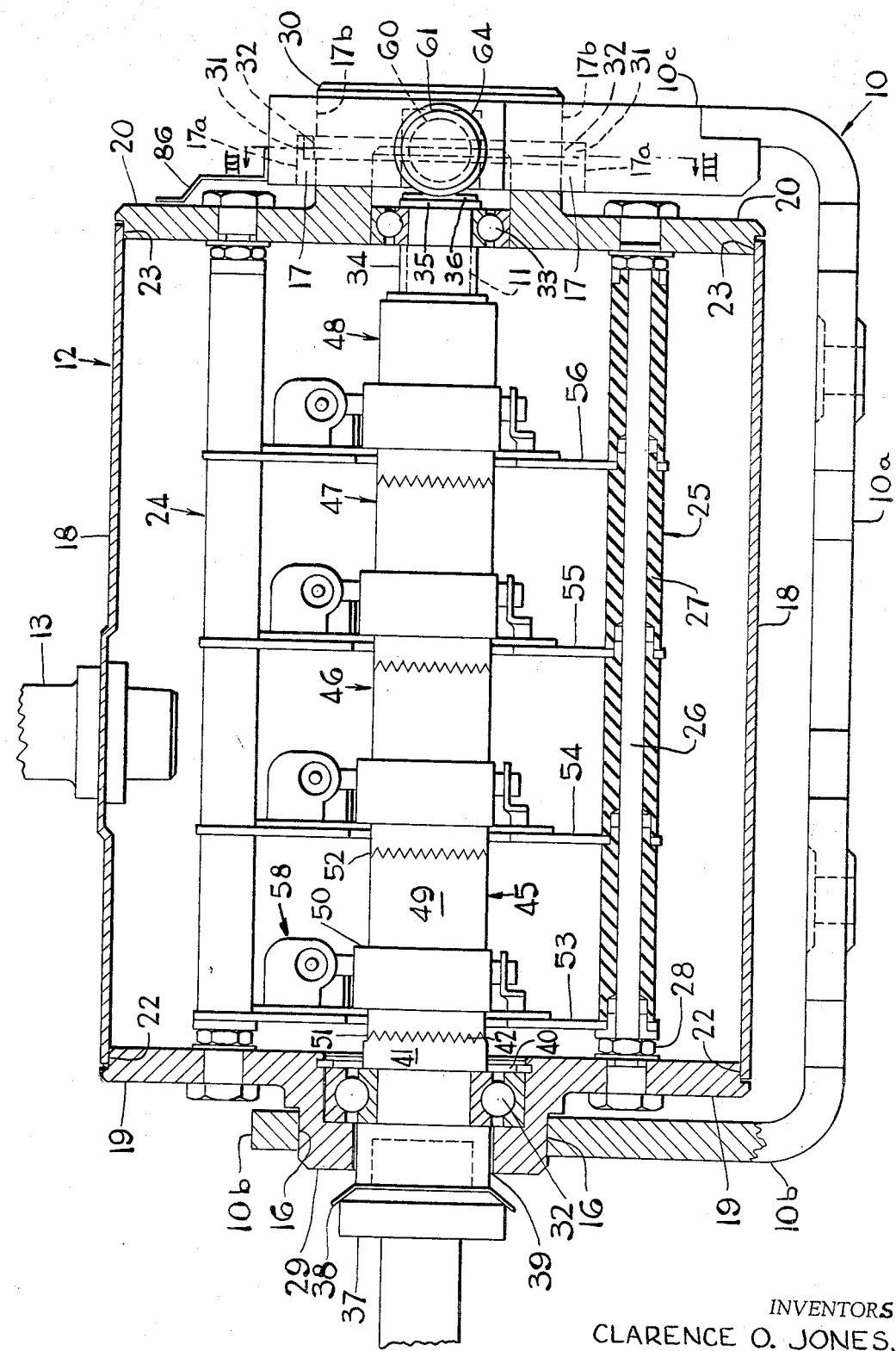

3,510,610
SWITCHING APPARATUS
Clarence O. Jones, Jr., Eggertsville, and William F. Abraham, Lancaster, N.Y., assignors to Niagara Machine & Tool Works, Buffalo, N.Y.
Filed Dec. 12, 1968, Ser. No. 783,245
Int. Cl. H01h 9/54
U.S. Cl. 200—25                                    21 Claims

ABSTRACT OF THE DISCLOSURE

Apparatus for performing a plurality of switching operations in response to input rotary motion. A housing is rotatably connected to a stationary mounting bracket, and an input shaft is positioned coaxially and rotatably within the housing. A plurality of electrical switches each including a movable contact arm are attached to the housing and a corresponding plurality of cams are positioned on the shaft. A spring-biased detent mechanism connected to the mounting bracket and a plurality of indentations provided circumferentially on the housing permit an adjustment of the rotational orientation of the housing relative to the shaft. Each switch includes means for adjusting the radial distance between the rest position of the movable arm and the axis of the shaft. The cams are adjustably rotatable on the shaft, and a plurality of teeth provided on the end faces of each thereof cooperate to lock the cams against relative rotational movement when urged together along the shaft but permit adjustment of the relative rotational orientation of the individual cams upon separation thereof.

BACKGROUND OF THE INVENTION

This invention relates to switching apparatus and, more particularly, to apparatus for performing a plurality of switching operations in response to input rotary motion.

A common area of use of the apparatus of the present invention is in the machine control art wherein the input rotary motion may be derived from the machine drive shaft and the switching operations thus performed, in conjunction with electrical circuits, control the time in the operating cycle and hence the position at which a machine component is stopped as well as the time when the component is again put in motion. A particular example of such a machine is a power press wherein the slide or ram is caused to move back and forth between a workpiece and a controlled top stop position for each complete rotation of the press drive shaft. By way of illustration the present invention will be described with particular reference to such machines, although the principles of the invention may be variously applied.

Switching apparatus proposed and patented heretofore for controlling the stop position of a machine component generally has been limited to relatively low speed operation. The prior art brush-commutator switching apparatus is known to "carbon over" at high speeds, which requires continuing maintenance and precludes use of this apparatus with sensitive control circuits. In addition, at relatively low speed operation, clutch and brake mechanisms can stop and restart the machine component practically instantaneously with the opening and closing of switches. At relatively high speeds, however, the response time of clutches and brakes results in a significant delay between switching and stopping and starting, causing the machine component to "coast" from the desired stop position and lag behind the desired start time. Other switching apparatus purporting to solve this problem by providing an adjustment of the switching time to a point earlier in the operating cycle as well as an adjustment of the duration of switching is nevertheless limited by the undesirable necessity of shutting down the entire machine whlie such adjustments are made.

SUMMARY OF THE INVENTION

The present invention provides novel machine-driven high speed switching apparatus for controlling the stopping and restarting of a component of the machine whereby the time in the operating cycle of the machine at which switching occurs together with the duration of the switching may be adjusted while the machine is in operation. In addition the invention provides, in such apparatus for performing a plurality of switching operations, a convenient adjustment in the synchronism among the various operations.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

BRIEF DESCRIPTION OF THE DRAWINGS

FIG. 1 is a plan view of the switching apparatus of the present invention;

FIG. 2 is a longitudinal sectional view taken on the line II—II of FIG. 1;

FIG. 3 is a cross-sectional view taken on the line III—III of FIG. 2; and

FIG. 4 is a side elevational view of a switch incorporated in the apparatus of FIGS. 1–3.

DETAILED DESCRIPTION OF THE PREFERRED EMBODIMENT

Like characters of reference denote like parts throughout the several figures of the drawings and, referring to FIG. 1, the switching apparatus of this invention includes a stationary mounting bracket 10, an input shaft 11, and a housing 12 coaxial with the shaft and rotatably supported by the bracket 10 in a manner that will be described. The bracket may be mounted at the underside or base portion thereof at a convenient location on a machine to be controlled, such as a power press, and the shaft 11 may be coupled through suitable means to the machine drive shaft. A conduit 13 extends from an opening 14 in the housing through which wires pass for making electrical connections between external machine control circuits and switches located within the housing 12.

As seen more clearly in FIG. 2 the mounting bracket 10 includes a base portion 10a and two generally upright flanges 10b, 10c. A circular aperture 16 of constant diameter is provided in flange 10b whereas an aperture 17 having first and second diameter portions 17a and 17b, respectively, is provided in flange 10c. The housing 12 includes a cylindrical portion 18 which conveniently may consist of two or more removable parts to facilitate the making of adjustments or repairs on internal components of the apparatus. The cylindrical portion 18 is coaxial with the shaft 11 and the housing is closed at each end thereof by first and second substantially disc-shaped members 19 and 20, respectively. Each of the members 19 and 20 is provided with a peripheral groove 22 and 23, respectively, for receiving a corresponding end of the cylindrical portion 18.

The members 19 and 20 are held in axially spaced relation along shaft 11 by a plurality of spacer members such as those designated 24 and 25 in FIG. 2. Each of the members, for example member 25, includes a solid rod 26 fixed at each end thereof to the members 19 and 20 by suitable fastening means as shown at 28, and a plurality of sleeves 27 of electrically insulating material which are coaxial therewith.

The members 19 and 20 also are provided each with a hub portion, in particular, member 19 with hub 29 and member 20 with hub 30. Hub 29 extends through aperture 16 in flange 10b and hub 30 extends through aperture 17 in flange 10c so that the entire housing 12 is securely but rotatably supported by the bracket 10. Hub 30 is provided with a plurality of circumferentially spaced teeth, such as 31, defining therebetween a plurality of grooves 32, which teeth extend into the larger diameter portion 17a of aperture 17 so that the housing may be locked in any desired rotational position as will be described further on in the specification.

Shaft 11 is rotatable within housing 12, specifically by means of bearing 32 in hub 29 and bearing 33 in hub 30. The shaft 11 is fixed axially relative to bearing 33, which itself is movable axially within hub 30, by means of sleeve 34, spacer 35 and snap ring 36 at the right-hand end thereof. At the other end, shaft 11 is releasably movable axially within bearing 32, which itself is fixedly positioned within hub 29. A lock nut 37 is threaded to shaft 11 external to the housing and when so secured urges a clip member 38 against a sleeve 39, the other end of which abuts bearing 32. Positioned around the shaft on the other side of bearing 32 are a bearing retainer 40 and a sleeve 41 splined to the shaft and provided with a plurality of teeth 42 around one end face thereof.

Spaced axially along shaft 11 are a plurality of motion transmitting elements, in this particular illustration four, in the form of cams 45–48. In preferred form each cam, for example cam 45, includes a cylindrical portion 49 and a lobe portion 50. Each cam is further provided with a plurality of teeth 51, 52 circumferentially around the end faces thereof, and upon engagement between the teeth of adjacent cams, the relative rotation of the cams 45–48 along shaft 11 will be fixed. The relative rotational orientation of the various cams, in turn, may be adjusted upon disengagement between the teeth of adjacent cams.

A corresponding plurality of plates 53–56 are attached to the spacer members 24, 25 as shown in FIG. 2, each plate having a central opening sufficient to allow passage of the shaft 11 and cams 45–48 therethrough and each plate being positioned in proximity to one of the cams. The plates 53–56 are clamped between the insulating portions 27 of adjacent spacer members. Attached to each plate is an electrical switch, for example switch 58 attached to plate 53, each switch having a movable arm which is periodically moved by a corresponding cam to open and close the switch as will be described further on in the specification.

In order to permit adjustment of the rotational orientation of the housing 12 with respect to the shaft 11, there is provided a detent mechanism 59, as shown in FIG. 3, which is adapted to selectively engage the plurality of indentations or grooves 32 between the teeth 31 circumferentially provided on hub 30. The mechanism 59 includes a plunger 60 slidable within a casing 61 which is connected in an opening 62 in flange 10c of mounting bracket 10. A detent 63 is provided at one end of the plunger, a knob 64 at the other end, and the plunger is biased by a spring 65 so as to urge the detent into one of the grooves or indentations 32 in hub 30. The length of travel of plunger 60 within casing 61 may be limited by a pin 66 which extends transversely with respect to the plunger axis into a slot 67 in casing 61. It is to be understood that various mechanical modifications in the structure of the detent mechanism 59 and its location and, accordingly, in the location of the cooperaing indentations, may be made without departing from the spirit and scope of this invention.

A preferred form of one of the switches, for example switch 58, is shown in FIG. 4 and includes a base 68 which is rigidly attached to one of the supporting plates, such as plate 53, in a siutable manner. A movable arm 69 having a contact portion 70 and cam follower portion 71 is pivotally mounted to base 68 at 72. In order to hold the movable arm 69 in a rest position there is provided a holding means 73 having a base 74 and first and second flanges 75 and 76, respectively. The means 73 is pivotally mounted at one end to switch base 68 at 72 and slidably connected at the other end thereof to base 68 by means of a spring clip 77 extending through corresponding slots provided in base 74 and switch base 68. A first electrical contact 68 is attached to flange 75 and a second contact 79 to the portion 70 of arm 69.

A spring 80 connected at one end to cam follower 71 and at the other end thereof to an upstanding portion 81 of base 68 biases the cam follower and the arm 69 connected thereto so that the contacts 78, 79 in this particular illustration are normally closed. In order to move the arm 69 from its rest position toward and away from the axis of its corresponding cam and, hence, the axis of shaft 11, there is provided a screw 82 extending through an upstanding flange 83 of switch base 68 and flange 76 of the holding means 73 and a biasing spring 84 connected to the screw and to one of the flanges. The switch 58 is electrically connected in an external control circuit and it is to be understood that one skilled in the art could make the necessary connections to contacts 78, 79 without departing from the spirit and scope of this invention.

The application of the switching apparatus of this invention to the control of a power press affords a convenient illustration of the operation thereof. Briefly, the press slide or ram is moved downward to press a workpiece and is returned upward to what is designated a top stop position during a working cycle. The stopping and restarting of the slide or ram at this top stop position is controlled by the present switching apparatus which may be readily mounted at the base 10a of bracket 10 on the press at a location conveniently accessible to the operator and which is driven through a suitable unitary ratio coupling from the press drive shaft.

For this particular illustrative application the switching apparatus includes four cams and associated switches although in other applications the number may vary. Each circuit is associated with a different control mode, some of which would control the operation of a clutch and brake for stopping and starting the press ram at the top position. In one particular application cam 45 and its associated switch perform a reset function in a single stroke mode whereby a repeat stroke is prevented unless the operator simultaneously presses both control buttons. Cam 46 and associated switch control clutch and brake operation at the bottom pick up point and at the top stop position in the single stroke mode, and cam 47 and associated switch control such operation at the top stop position in a continuous mode. In this particular application cam 48 and associated switch are used to check the functioning of the circuit associated with cam 45 but could, for example, also be used to control a counter or an additional mode of operation.

Assume, for illustration, that the press is operating in the single stroke mode so that cam 46 and its associated switch, which is identical to switch 58, are effecting the control. During each rotation of the press drive shaft and thus shaft 11, the lobe of cam 46 will contact and move the follower portion 71 of the switch arm 69 so as to open the switch contacts 78, 79 for a predetermined time, and thereafter leave the follower 71 resulting in the reclosing of the contacts. The press control circuit including contacts 78, 79, in response to the opening thereof, for example, would signal declutching and braking so as to stop the press ram at the top position and would signal clutching and debraking to return it on a downward stroke in response to the reclosing of contacts 78, 79.

At relatively low operating speeds the response time of the mechanical components of the system, particularly the clutches and brakes, is not significant enough to result in an undesirable time delay between switching and stopping or starting of the press ram. At relatively higher speeds such as 1000–1200 r.p.m. a significant time delay does occur which results in the ram "coasting" beyond the desired stop position and beginning its return stroke at a time later than desired. To compensate for these delays the relative rotational orientation of the cam lobe and follower can be changed so that contact therebetween and, hence, opening of the switch contacts occurs earlier in time during the rotation of shaft 11 and thus earlier in the press cycle.

The time in the press cycle when the contacts are reclosed and the ram begins a return stroke is determined by the length of time that the cam lobe engages the follower to hold the contacts open. This time is also known as the dwell angle and may be adjusted at higher machine operating speeds so as to return the ram earlier in the cycle by changing the radial distance between the cam follower in what may be designated a rest position and the axis of the cam. With switching apparatus heretofore available such adjustments, when possible, could be made only when the input shaft was stationary which required shutting down of the entire machine.

A significant advantage of the present invention is that the aforementioned adjustments can be made while the press or machine is in operation. When a change in operating speed is to occur, the operator may adjust the rotational orientation of the cam, attached to shaft 11, relative to the cam follower on the movable arm of the switch, attached to the housing, merely by changing the rotational orientation of the housing relative to the shaft. The knob 64 is simply pulled out far enough so that detent 63 no longer engages one of the grooves 32 between teeth 31, the housing is rotated an amount sufficient to provide the desired adjustment, and then the knob 64 released so that detent 63 engages a different groove whereupon the housing is locked in this position corresponding to a new rotational orientation relative to shaft 11. A pointer 86 attached to flange 10c of the mounting bracket and a scale 87 on member 20 calibrated in r.p.m. will enable the operator to make the necessary compensating adjustment in terms of the new operating speed.

The dwell angle may also be adjusted while shaft 11 is rotating simply by removal of part of the cylindrical portion 18 of the housing and turning the screw on any particular switch, for example screw 82, so that the holding means 73 and hence flange 75 is moved toward or away from shaft 11. The distance between cam follower 60 in its rest position and the axis of the shaft will thus be adjusted and the head of screw 82 may have associated therewith a scale calibrated in r.p.m. (not shown) to aid the operator in making adjustments.

When the switching apparatus is first installed on the machine to be controlled it is necessary to adjust the synchronism among the various switches. This is done by changing the relative rotational orientation of the cams 45–58 on shaft 11 in the following manner. The cams are shown in FIG. 2 locked against relative rotation. Nut 37 may be loosened and, together with clip 38, moved a short distance to the left along shaft 11, whereupon the shaft may be moved within bearing 32 a short distance to the right as viewed in FIG. 2. This, in effect, increases the axial distance between sleeve 34 and bearing 33.

The teeth 51 on cam 45 no longer lockingly engage the teeth 42 on member 41, and now each of the cams may be displaced slightly along shaft 11 to disengage the corresponding sets of teeth to permit independent rotation of the cams. When the desired relative orientation is obtained the shaft is moved to the left, thus decreasing the effective distance between sleeve 34 and bearing 32 and urging the cams together so that the corresponding sets of teeth lock in engagement and so that the teeth 42 of member 41 lock with the teeth 51 on cam 45. The clip is moved back into position and nut 37 screwed onto shaft 11 to maintain the fixed axial position.

The switching apparatus of this invention advantageously may be operated at high speeds with a long life, for example at 1000 r.p.m. for 50 million cycles. The arrangement of motion transmitting elements or cams along the input shaft with all the electrical connections made to switches attached to the housing and provided with movable arms does not have the "carboning over" problem which limits prior brush-commutator switching arrangements to low speed operation. The two adjustments needed for high speed operation in controlling the stop position of a machine part can both be made while the machine is in motion. In addition, the synchronism among the various electrical switches can be changed by a simple adjustment of the relative rotational orientation of the motion transmitting elements or cams on the shaft.

What is claimed is:

1. In combination with a machine having a plurality of electrical circuits for controlling the operation thereof, switching apparatus comprising:
    (a) a stationary mounting bracket;
    (b) a housing rotatably connected to said mounting bracket;
    (c) an input shaft positioned coaxially within said housing and rotatably connected thereto;
    (d) means for adjusting the rotational orientation of said housing with respect to said shaft;
    (e) a plurality of electrical switches attached to said housing and connected in said electrical circuits, said switches each including a movable arm; and
    (f) a plurality of motion transmitting elements rigidly secured to said shaft and axially positioned thereon whereby upon rotation of said shaft each of said motion transmitting elements will periodically move a corresponding one of said switch arms.

2. The combination according to claim 1 including means for connecting the drive shaft of said machine to said input shaft.

3. The combination according to claim 2 wherein said machine is a power press and said electrical circuits control the ram clutch and brake thereof.

4. The combination according to claim 1 wherein said means for adjusting the rotational orientation of said housing comprises:
    (a) a plurality of indentations circumferentially provided in a surface of a portion of said housing; and
    (b) a detent mechanism connected to said mounting bracket and adapted to engage selectively said indentations.

5. The combination according to claim 4 wherein said portion of said housing comprises a substantially discshaped member provided with a hub, said hub being rotatably positioned in an aperture in said mounting bracket.

6. The combination according to claim 5 wherein said indentations are provided in said hub.

7. The combination according to claim 4 wherein said detent mechanism comprises:
    (a) a plunger provided with a detent at one end thereof; and
    (b) a spring biasing said plunger to normally position said detent in engagement with one of said indentations.

8. The combination according to claim 1 wherein each of said motion transmitting elements comprises a cam and wherein each of said movable arms has a cam follower connected thereto.

9. In combination with a machine having a plurality of electrical circuits for controlling the operation thereof, switching apparatus comprising:
    (a) a stationary mounting bracket;
    (b) a housing connected to said mounting bracket;
    (c) an input shaft positioned coaxially within said housing and rotatably connected thereto;

(d) a plurality of electrical switches attached to said housing and connected in said electrical circuits, said switches each including a movable arm;

(e) a plurality of motion transmitting elements rigidly secured to said shaft and axially positioned thereon whereby upon rotation of said shaft each of said motion transmitting elements will periodically move a corresponding one of said switch arms; and (f) each of said switches further including holding means for holding said arm in a rest position when not being moved by said motion transmitting element and adjusting means operatively connected to said holding means for moving said arm in a rest position toward and away from the axis of such shaft.

10. The combination according to claim 9 including means for connecting the drive shaft of said machine to said input shaft.

11. The combination according to claim 10 wherein said machine is a power press and said electrical circuits control the ram clutch and brake thereof.

12. The combination according to claim 9 wherein each of said motion transmitting elements comprises a cam and each of said movable arms comprises a cam follower pivotally mounted at one end to said switch and an arm connected to said follower and provided with an electrical contact thereon.

13. The combination according to claim 12 wherein each of said switches includes a base and said holding means is movably connected to said base.

14. The combination according to claim 13 wherein said adjusting means is connected to said switch base and to said holding means and controls the relative movement between said base and said holding means.

15. The combination according to claim 14 wherein said holding means comprises a member having a base and first and second flanges, said base being movably connected to said switch base and positioned thereon so that said contact arm of said movable arm normally rests against one of said flanges and is moved in the region between said flanges when said cam moves said follower.

16. The combination according to claim 15 wherein said adjusting means comprises a spring-biased screw connected to said switch base and to the other of said flanges.

17. The combination according to claim 15 including a first electrical contact attached to said contact arm of said movable arm and a second electrical contact attached to said flange against which said arm normally rests, said first and second contacts being in engagement when said arm rests against said flange.

18. In combination with a machine having a plurality of electrical circuits for controlling the operation thereof, switching apparatus comprising:

(a) a stationary mounting bracket;

(b) a housing connected to said mounting bracket;

(c) an input shaft positioned coaxially within said housing and rotatably connected thereto;

(d) a plurality of electrical switches attached to said housing and connected in said electrical circuits, said switches each including a movable arm; and (e) a plurality of motion transmitting elements each adapted to be positioned axially on said shaft so as to periodically engage a corresponding one of said switch movable arms and each having end faces provided with locking means thereon whereby said elements are held in a fixed rotational alignment when urged into end-to-end engagement.

19. The combination according to claim 18 wherein said locking means comprises a plurality of teeth circumferentially provided on the end faces of each of said motion transmitting elements.

20. The combination according to claim 18 including means for connecting the drive shaft of said machine to said input shaft.

21. The combination according to claim 20 wherein said machine is a power press and said electrical circuits control the ram clutch and brake thereof.

References Cited

UNITED STATES PATENTS

| | | | |
|---|---|---|---|
| 2,424,626 | 7/1947 | Oberdick | 200—30 |
| 2,674,662 | 4/1964 | Hieger | 200—30 |
| 2,963,628 | 12/1960 | Ostland. | |
| 3,221,116 | 11/1965 | McAllister | 200—27 |
| 3,287,511 | 11/1966 | Schwab | 200—14 |

ROBERT K. SCHAEFER, Primary Examiner

J. R. SCOTT, Assistant Examiner

U.S. Cl. X.R.

200—38, 153